US012392624B2

(12) United States Patent
Ravishankar et al.

(10) Patent No.: US 12,392,624 B2
(45) Date of Patent: Aug. 19, 2025

(54) STOCHASTIC ROUTE PLANNING FOR ELECTRIC VEHICLES

(71) Applicant: The Regents of the University of California, Oakland, CA (US)

(72) Inventors: Chinya V. Ravishankar, Irvine, CA (US); Payas Rajan, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 106 days.

(21) Appl. No.: 18/220,723

(22) Filed: Jul. 11, 2023

(65) Prior Publication Data

US 2024/0019260 A1  Jan. 18, 2024

Related U.S. Application Data

(60) Provisional application No. 63/359,956, filed on Jul. 11, 2022.

(51) Int. Cl.
*G01C 21/34* (2006.01)
(52) U.S. Cl.
CPC ..... *G01C 21/3469* (2013.01); *G01C 21/3446* (2013.01)
(58) Field of Classification Search
None
See application file for complete search history.

(56) References Cited

U.S. PATENT DOCUMENTS

| 7,573,866 | B2 | 8/2009 | Nikolova | |
|---|---|---|---|---|
| 10,429,199 | B2 | 10/2019 | Mason | |
| 10,535,256 | B1 | 1/2020 | Lim | |
| 11,435,199 | B2* | 9/2022 | Lermusiaux | G01C 21/3469 |
| 2011/0224900 | A1 | 9/2011 | Hiruta | |
| 2011/0257879 | A1 | 10/2011 | Ishibashi | |
| 2015/0241233 | A1* | 8/2015 | Loftus | G01C 21/3682 |
| | | | | 701/410 |
| 2017/0030728 | A1 | 2/2017 | Baglino | |
| 2017/0074677 | A1 | 3/2017 | MacNeille | |
| 2021/0018322 | A1* | 1/2021 | Jiang | G06F 16/9024 |
| 2022/0146272 | A1* | 5/2022 | Verma | G01C 21/3446 |
| 2022/0205796 | A1* | 6/2022 | Wray | G01C 21/3407 |

(Continued)

OTHER PUBLICATIONS

Yang, Stochastic Skyline Route Planning Under Time-Varying Uncertainty (Year: 2014).*

(Continued)

*Primary Examiner* — Ryan Rink
(74) *Attorney, Agent, or Firm* — Perkins Coie LLP

(57) ABSTRACT

A method for stochastic electrical vehicle route planning associates weights with road segments, where the weights are probability distributions representing travel time along the segments. Weights representing energy consumption along the segments may be represented as a probability distribution or a deterministic value representing an expectation of a distribution. The method involves performing a Dijkstra search on the road network graph from the vehicle origin to the vehicle destination, where the Dijkstra search computes for each vertex along a path in the network from the vehicle origin to the vehicle destination a convolution of edge weights along the path. The Dijkstra search also includes computing and propagating along the path labels representing the tradeoffs between charging times and total travel-time.

19 Claims, 5 Drawing Sheets

(56) References Cited

U.S. PATENT DOCUMENTS

2022/0272029 A1* 8/2022 Vasseur .................. H04L 45/24
2024/0094017 A1* 3/2024 Baum ................ G01C 21/3697

OTHER PUBLICATIONS

Baum, Shortest Feasible Paths with Charging Stops for Battery Electric Vehicles (Year: 2019).*

Rajan et al., Stochastic Route Planning for Electric Vehicles. 20th International Symposium on Experimental Algorithms (SEA 2022). Jul. 11, 2022.

Payas Rajan. Electric Vehicle Route Planning in the Presence of Stochasticity. PhD dissertation. UC Riverside Electronic Theses and Dissertations. Mar. 2022.

* cited by examiner

400 Storing at a server a graph representing a road network, the graph comprising vertices and edges between vertices, where the vertices represent locations in the vehicle road network, including charging stations, and the edges represent road segments between the locations

402 At the server, receiving over a communications network and storing for each edge of the graph a first edge weight representing travel time along the edge, and storing for each edge of the graph a second edge weight representing energy consumption for travel along the edge, where the first edge weight is represented as a probability distribution and the second edge weight is represented as a probability distribution or a fixed value which may be the expectation of a probability distribution

404 Receiving over a communication network a vehicle origin and a vehicle destination and other relevant vehicle parameters, the optimality criterion to be used in routing, type and level of non-stranding assurance

406 Performing a Dijkstra search of the graph from the vehicle origin to the vehicle destination to find feasible paths that are optimal according to specified optimality criteria, where the Dijkstra search computes for each vertex along a path in the network from the vehicle origin to the vehicle destination a convolution of edge weights along the path, where the Dijkstra search involves computing and propagating labels along the path that represent feasible charging times vs total travel-time tradeoffs

408 Returning over a communication network paths from source to destination that are optimal according the specified criteria and provide the type and level of non-stranding assurance required

*Fig. 4*

STOCHASTIC ROUTE PLANNING FOR ELECTRIC VEHICLES

CROSS-REFERENCE TO RELATED APPLICATIONS

This application claims priority from U.S. Provisional Patent Application 63/359,956 filed Jul. 11, 2022, which is incorporated herein by reference.

FIELD OF THE INVENTION

The present invention relates generally to route planning for electric vehicles. More specifically, it relates to techniques for stochastic route planning.

BACKGROUND OF THE INVENTION

Batteries for Electric Vehicles (EVs) have limited capacity and long charging times, and the charging infrastructure remains sparse. Running out of battery charge is a real possibility, so route planning must identify energy-feasible routes, which will not result in vehicle stranding. EV routing must therefore explicitly account for the EV's energy consumption, and plan visits to charging stations along the route, as needed.

Conventional approaches to EV route planning maintain the energy-feasibility of routes while minimizing total travel time, including the charging time. Electric Vehicle routing is often modeled as a generalization of the energy-constrained shortest path problem, taking travel times and energy consumptions on road network edges to be deterministic. Current algorithms such as the Charging Function Propagation method, for example, may be used to calculate such routes when the energy consumption and travel times for each edge in the road network graph are known deterministically.

However, different trips on any given route by the same vehicle may consume different amounts of energy, due to transient factors, such as driver behavior, traffic, weather, or the battery state. In practice, therefore, travel times and energy consumption must be modeled stochastically as probability distributions, making route planning a difficult challenge.

Although some approaches exist that attempted stochastic route planning for EVs, they assume deterministic energy consumptions. Current stochastic route planning methods either fail to ensure that routes are energy-feasible, or if they do, they do not scale well to large road network graphs. Despite recent improvements, existing stochastic routing approaches are typically several orders of magnitude slower than deterministic routing. Existing approaches to route planning for EVs with stochastic travel times and energy consumptions work well for road network graphs of only up to a few hundred vertices, but do not scale up to continental-sized road networks. There is thus a need to allow for stochastic travel time and energy consumption distributions for larger networks.

BRIEF SUMMARY OF THE INVENTION

Herein is disclosed techniques for electric vehicle routing algorithms, specifically stochastic vehicle routing, where time costs along edges of a road network graph are probability distributions, while the energy costs may be probability distributions or deterministic values which may represent the expected values of probability distributions. When energy consumptions are probability distributions, our methods can be used to obtain routes that meet user-specified levels of assurance that the vehicle will not be stranded. When case energy consumption along network edges are deterministic, our methods can be used to provide a non-stranding guarantee along the route. In both cases, techniques disclosed herein provide more realistic types of guarantees against the EV driver getting stranded along the route than the current state-of-the-art.

Techniques disclosed herein represent a vehicle road network as a graph where vertices represent the locations on a road network and edges represent the road segments. Some vertices may be charging stations with pre-defined charging functions that capture the tradeoffs between charging time and charge added to an electric vehicle. Edges of the graph have associated weights that include probability distributions. A Dijkstra's search is performed on the graph, using labels that restrict search paths to only those that match desired levels of guarantees against stranding.

We provide a method to find vehicle routes to maximize on-time arrival probability and the set of non-dominated routes under two criteria for stochastic route feasibility: $\mathbb{E}$-feasibility and p-feasibility. Our $\mathbb{E}$-feasibility criterion ensures energy-feasibility in expectation, using expected energy values along network edges. Our p-feasibility criterion accounts for the actual distribution along edges, and keeps the stranding probability along the route below a user-specified threshold p. We generalize the charging function propagation algorithm to accept stochastic edge weights to find routes that maximize the probability of on-time arrival, while maintaining $\mathbb{E}$- or p-feasibility. We also extend multi-criteria Contraction Hierarchies to accept stochastic edge weights and offer heuristics to speed up queries. Our experiments on a real-world road network instance of the Los Angeles area show that our methods answer stochastic queries in reasonable time, that the two criteria produce similar routes for longer deadlines, but that $\mathbb{E}$-feasibility queries can be much faster than p-feasibility queries.

In one aspect, the invention provides a method for stochastic electrical vehicle route planning, the method comprising: storing at a server a vehicle road network as a graph comprising vertices and edges between vertices, where the vertices represent locations in the vehicle road network and the edges represent road segments between the locations, where some vertices represent charging stations associated with charging functions representing tradeoffs between vehicle charging times and charge added; storing at the server for each edge of the graph a first edge weight representing travel time along the edge, and storing for each edge of the graph a second edge weight representing energy consumption for travel along the edge, where the first edge weight is represented as a probability distribution, and the second edge weight is represented as either a probability distribution or a deterministic value representing an expectation of a distribution; receiving from a vehicle over a communication network, a vehicle origin and a vehicle destination; performing a Dijkstra search on the graph from the vehicle origin to the vehicle destination, wherein the Dijkstra search computes for each vertex along a path in the network from the vehicle origin to the vehicle destination a convolution of edge weights along the path, wherein the Dijkstra search comprises computing and propagating, along the path, labels representing the tradeoffs between charging times and total travel-time; and transmitting over the communications network to the vehicle a feasible route produced from the Dijkstra search.

The output of the method is a feasible path, either probabilistically or in expectation. In some implementations, the labels generated at a vertex comprise stochastic travel time distributions along the path, stochastic energy consumption distributions or deterministic energy consumption values along the path, fixed amount of energy consumed along the path from the source to the vertex, an expectation of an energy consumption distribution from an immediately preceding charging vertex along the path from the vehicle origin, and/or a state of charge on arrival at a charging vertex with a non-stranding probability p or a non-stranding guarantee in the case of deterministic energy consumptions, and a charging function at the charging vertex.

In some implementations, the energy consumption is a probability distribution, and the tradeoffs between charging times and total travel-time are constrained to satisfy a predetermined user-specified probabilistic feasibility of the route representing a level of assurance that a vehicle traveling the computed route will not be stranded. In other implementations, the energy consumption is deterministic, and the tradeoffs between charging times and total travel-time are constrained to satisfy a non-stranding guarantee when the energy consumption is deterministic.

The method may further comprise discretizing domains of the probability distributions to produce histograms. In some implementations, the probability distributions are discretized distributions and wherein the Dijkstra search labels are propagated per domain interval (bin) of the discretized distributions. In some implementations, the discretized distributions are set as edge-weight histograms in a graph representing the road network.

In some implementations, performing the Dijkstra search comprises choosing a best label by selecting a dominance criterion, ranking the collection of labels corresponding to bins of the discretized distributions according to the selected dominance criterion, and selecting the highest-ranked label.

In some implementations, receiving over the communication network the vehicle origin and the vehicle destination further comprises receiving relevant vehicle parameters, an optimality criterion to be used in routing, and a type and level of non-stranding assurance.

BRIEF DESCRIPTION OF THE SEVERAL VIEWS OF THE DRAWINGS

FIG. 4 is a flowchart providing an overview of the method for determining a vehicle route through a road network from a source to a destination, according to an embodiment of the invention.

DETAILED DESCRIPTION OF THE INVENTION

Figure 1:
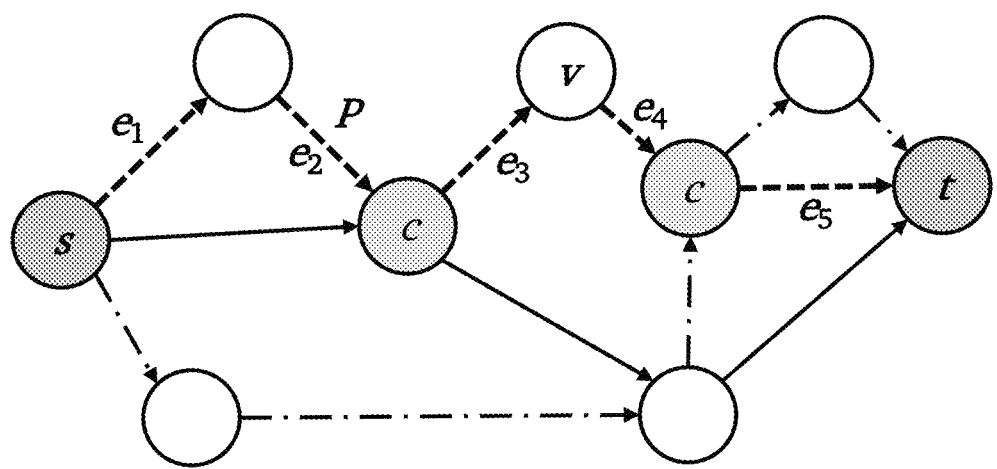
FIG. 1 is a simple example of a vehicle road network graph, showing three different paths a vehicle could travel from a source to a destination, according to an embodiment of the invention.

We begin with an overview of a method for vehicle routing, according to a preferred embodiment of the invention. We are given a graph G representing a road network. FIG. 1 illustrates a simple graph, showing a source vertex s, a destination vertex t, and three example s-t paths connecting s, to t, where each path is defined by a set of vertices and edges (road segments) connecting them. Vertices that provide EV charging are labeled c. Associated with the edges of the network are probability distributions for travel times and for energy consumptions along the graph edges. These distributions are the "edge weights." The edge weight distributions may be negative, as when an electric vehicle descends a hill, and recovers energy, instead of consuming it. Under suitable assumptions, it may be possible to infer energy consumptions from the travel time distributions, using a vehicle model, and elevations and other geographic data about the road network. Some graph vertices in the graph may be charging stations. An electric vehicle may halt at charging stations, and recharge its batteries, if needed. The rate at which charge is accumulated at a charging station is described by a charging function that gives the battery's State-of-Charge (SoC) as a function of charging time. The charging function is specific to each charging station.

The goal of the method is to find a path P for a vehicle to take from a source vertex s to a destination vertex t in the graph G, so that the travel time and energy consumption along P satisfy given constraints. The intent is to ensure that the EV reaches the destination while satisfying the travel time constraints, but without being stranded.

In existing routing methods, energy consumptions and travel times along each edge in the graph are assumed to be deterministic, so it is known deterministically whether stranding will occur along a given path P. In our case, energy consumptions are stochastic, so stranding is probabilistic. We guarantee non-stranding in two ways: (1) in expectation, (2) or that it remains above a user-specified probability threshold p.

In existing routing methods, a feasible path is defined one on which the EV's State of Charge (SoC) is guaranteed to be non-zero at all points along the path (so the driver is never stranded along the route). This notion of feasibility does not work in the stochastic case, since energy consumptions are stochastic. Different trips along the same path may result in different values for travel time and energy consumption. This is why the user must explicitly specify a desired non-stranding probability p.

The present method defines $\mathbb{E}$-Feasible and p-Feasible criteria to characterize the desired probability of non-stranding. An $\mathbb{E}$-Feasible path is one where the expected value of the EV's SoC is guaranteed to non-zero everywhere along the path. This makes energy consumptions deterministic, but travel times remain stochastic. A p-Feasible path is one on which the probability of SoC being non-zero everywhere along the path is no less than a given value p.

The present method introduces stochastic versions of energy depletion functions corresponding to $\mathbb{E}$-Feasible and p-Feasible criteria. At vertex v, for purposes of exposition, let us call a charging action sufficient at a previous charging vertex c if the amount of charge acquired at c suffices to travel from c to v with the specified non-stranding probability p.

In existing routing methods, a set of "labels" is associated with each vertex v, where a label corresponds to a feasible path from source to v, and a sufficient charging action at the last charging vertex c. In these existing routing methods, a label carries information about a feasible path P from source to v, and contains (1) deterministic travel times from the source vertex, (2) deterministic energy consumptions from the last charging vertex c, (3) the state of charge on arrival at vertex c, and (4) the charging function at c. In the present work, labels are adapted for use in the stochastic case. Our labels carry: (1) the stochastic travel times distributions along the path from the source, (2) the stochastic energy consumption distribution from the last charging vertex c, (3) state of charge on arrival at vertex c, with a non-stranding probability p, (4) the charging function at c. We also discretize the path weight function by dividing its domain into segments. We create a label per domain segment (or histogram bin) of the discretized path weight function along each feasible path P from source to v, for each sufficient charging action at the last charging station c. We also introduce appropriate label manipulations during search for the E-feasibility criterion and for the p-feasibility criterion.

Searching the road network graph G for optimal paths uses a method to compare labels, so that during the search, we can reject labels which are dominated by other labels. In existing routing methods, all values are fixed numbers, and can be compared directly. In the stochastic case, they are distributions instead of values, so we use a different approach. Since our travel times are stochastic, we can not use the deterministic dominance criterion and instead use something called the "usual stochastic ordering." Other suitable stochastic orderings may also be used. We implement a search method for the desired path, including the details of label management, for $\mathbb{E}$-Feasible routing, and p-Feasible routing.

An overview of a method for stochastic electrical vehicle route planning according to an embodiment of the invention is shown in FIG. 4. In step 400, a computer server stores a graph representing a road network, the graph comprising vertices and edges between vertices, where the vertices represent locations in the vehicle road network, including charging stations, and the edges represent road segments between the locations. In step 402, the computer server receives over a communications network and stores for each edge of the graph a first edge weight representing travel time along the edge, and stores for each edge of the graph a second edge weight representing energy consumption for travel along the edge, where the first edge weight is represented as a probability distribution and the second edge weight is represented as a probability distribution or a fixed value which may be the expectation of a probability distribution. In step 404, the computer server receives over a communication network a vehicle origin and a vehicle destination and other relevant vehicle parameters, the optimality criterion to be used in routing, type and level of non-stranding assurance. In step 406, the computer server performs a Dijkstra search of the graph from the vehicle origin to the vehicle destination to find feasible paths that are optimal according to specified optimality criteria, where the Dijkstra search computes for each vertex along a path in the network from the vehicle origin to the vehicle destination a convolution of edge weights along the path, where the Dijkstra search involves computing and propagating labels along the path that represent feasible charging times vs total travel-time tradeoffs. In step 408, the computer server returns, over the communication network, paths from source to destination that are optimal according the specified criteria and provide the type and level of non-stranding assurance required.

Figure 5:
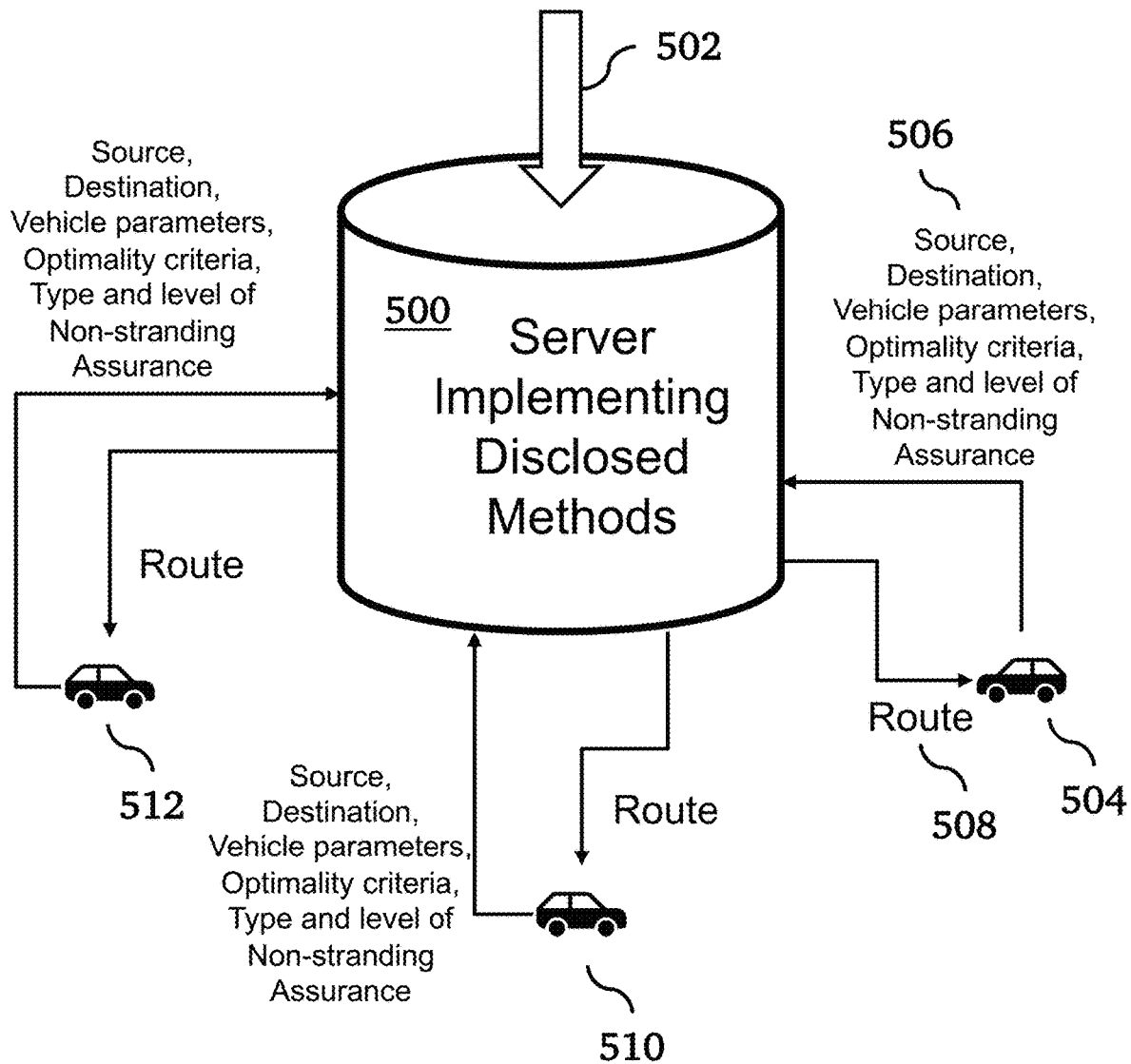
FIG. 5 is a schematic diagram of a system implementing a method for determining a vehicle route through a road network from a source to a destination, according to an embodiment of the invention.

FIG. 5 is a schematic diagram of a system implementing a method for determining a vehicle route through a road network from a source to a destination, according to an embodiment of the invention. The system includes a server 500 which may include one or more computers networked with each other, and vehicles 504, 510,512, which communicate with the server 500 over a data communications network which typically would include a combination of wireless and wired data communication networks. It is understood that the vehicles may be devices, such as a mobile phone located within a vehicle. The server 500 receives information updates 502 over a data network regarding the road network topology (vertices and edges), edge weights (travel time and energy consumption distributions), and possibly other information such as traffic and weather conditions. A vehicle 504 requesting routing sends to the server 500 information including vehicle source, vehicle destination, as well as a type and a level of non-stranding assurance. This information may also include vehicle type, current charge state, driver preferences, and other details relevant to routing. After the server determines route(s) for the vehicle, this routing information is sent from the server 500 to the vehicle 504, which then uses the information to guide the human driver or autonomous driving system along the route.

Herein is disclosed a method to ensure the probabilistic feasibility of routes when both the travel time and energy consumption along the edges of the graph are known only stochastically (in the form of arbitrary probability distributions). We say that a route is Expected-feasible (or $\mathbb{E}$-Feasible) when the feasibility is maintained along the route using the expected values of energy consumption along the edges, or p-Feasible, when the probability of the driver not getting stranded along the route is at least p. Our method determines the $\mathbb{E}$-Feasible and p-Feasible routes by extending the Charging Function Propagation approach to the case where travel time and energy consumption are only known stochastically.

To accommodate stochastic edge weights, we replace the deterministic edge weights corresponding to the parameter of interest (travel time, energy consumption, etc.) by a distribution representing the stochastic nature of the edge weight. Edge-weight distributions could be discrete or continuous.

If the original edge weight distribution is not discrete, we discretize the domain of this distribution. This discretized distribution will usually take the form of an edge-weight histogram (effectively, a bar graph). Each "bin" of this histogram represents an interval from the domain of the histogram (travel time, energy consumption, etc.). The value in the bin (the height of the bar) corresponds to the probability of the value being in that bin.

The charging function is segmented, ensuring that the function in each segment is concave. The domain points defining these segments are the breakpoints.

The "charging vs travel-time tradeoffs" are computed only for each breakpoint of the charging function. (As noted, the function in each segment must be concave. It is common to use linear approximations, since that is sufficiently accurate in practice, and simplifies computation.) Our algorithm uses these values for the preceding charging station along this route, and these values are propagated as labels during the search for the optimal path.

The search for the optimal path proceeds along the edges of the graph by examining candidate paths. For this, we need the edge weight distribution corresponding to each candidate path. The distribution for any path is obtained by convolving the distributions for the edges constituting the path. This convolution could occur either before or after the discretization of the edge distributions. We mark the starting node as a 'virtual' charging station. Now, as the search reaches each subsequent charging station, we create Dijkstra's search labels that represent the full set of charging-travel time tradeoffs for each bin of the aggregate travel time and energy consumption histogram.

A key feature of our approach is that we propagate labels per domain interval. In the case of deterministic edge weights, there is only one set of labels propagated. In our case, the edge weights are not deterministic, but stochastic. Therefore, we compute and propagate labels per domain interval (bin) of the discretized distribution. The discretization of the edge weight distribution could be before or after the convolution is computed. When making a choice of label during the search, we form the union of all the labels for the various bins of the histogram, and choose the best label from this union.

These modifications described to the Charging Function Propagation algorithm are enough to result in a correct solution to the problem. Further optimizations may be included to improve performance.

For example, one enhancement is to apply any of the available speedup methods for large (city-sized) road networks. We divide the problem into two parts: preprocessing and query. In the preprocessing state we use a stochastic variant of Contraction Hierarchies to preprocess the road network and add shortcut edges. In the query stage, these shortcut edges can be used to answer queries quickly. To simplify processing, we use a restricted-dominance criterion, which checks for the dominance of a distribution over another only within a fixed interval, which we set to two standard deviations on either side of the expected value of all distributions. We use an $\epsilon$-dominance criterion, which relaxes our stochastic dominance criterion by a fixed multiplicative factor. Our method can be used in conjunction with a tiering method to reduce query times even further. When tiering is applied, the Contraction Hierarchy is divided into 'tiers', each of which use either a histogram or a function to represent the energy consumption and travel time distributions.

To more efficiently find correct solutions for the shortest $\mathbb{E}$-Feasible and p-Feasible path in graphs with more than a few hundred vertices, various enhancements can be used. There are existing methods, such as Contraction Hierarchies, or Customizable Route Planning, that have been used to achieve speed-ups on graph search algorithms. In a preferred implementation, our method achieves speedup by combining Stochastic Contraction Hierarchies and multi-criteria Contraction Hierarchies to obtain Stochastic Multi-Criteria Contraction Hierarchies, to deal with the case of stochastic edge weights. Other approaches may also be used to obtain speed-up. Indeed, any of various deterministic shortest path speedup techniques that satisfy the conditions listed below can be extended to stochastic edge weights, and therefore, may be used along with our technique described above. These conditions are as follows: (a) Changing the edge weights from totally-ordered deterministic edge weights to stochastic edge weights (which may only admit a partial stochastic order) does not affect the correctness of the shortest path algorithm. (b) After replacing the deterministic edge weights with stochastic ones as above, the speedup technique does not result in slower query times than the baseline for most randomly-generated shortest path queries. (c) Another way to scale up our solution is to relax the dominance criteria with techniques such as Epsilon-dominance and the restricted dominance criterion.

We now provide a more detailed and rigorous description of the method.

Consider a graph $G=\langle V,E \rangle$, where V is the set of vertices, representing locations in a road map, and E is the set of edges, representing road segments connecting the locations. We assume that each edge $e \in E$ is assigned two stochastic edge weights, representing the probability distributions of travel time and energy consumption respectively. Note that the given probability distributions may be arbitrary, without any functional form, and may be represented as histograms or in their functional form as a well-known distribution such as the Gaussian, beta, or gamma distributions. Then, the total cost (energy consumption or travel time) of an s-t path P traversing n edges $e_1, e_2, \ldots, e_n$ in G can then be computed as a convolution of the edge weights along P, and is given by $\text{cost}(P) = *_{e \in P} W(e)$, where W(e) represents the distribution of travel time or energy consumption for the edge e. Also assume that a subset of vertices in V are marked as charging stations with given charging functions that map from the initial state of charge and charging time to the final state of charge of the EV.

Then, we define the following:
$\mathbb{E}$-Feasible route: A route P is said to be $\mathbb{E}$-Feasible if the State of Charge of the EV does not drop below zero at any point along P.
p-Feasible route: A route P is said to be p-Feasible if the probability of the State of Charge of EV not dropping below zero at any point along P is at least p. Using the above definitions, we now define the following EV routing queries:
Shortest $\mathbb{E}$-Feasible routing query: Given G, a source vertex s, a destination vertex t, the vehicle-specific parameters of the EV, and a starting state of charge $\beta$, the goal is to find an $\mathbb{E}$-Feasible route from s to t that minimizes the total travel time including the charging time.
Shortest p-Feasible routing query: Given G, a source vertex s, a destination vertex t, the vehicle-specific parameters of the EV, a starting state of charge $\beta$, and a non-stranding probability p, the query returns a p-Feasible route from s to t that minimizes the total travel time including the charging time.
Note that the term 'shortest' does not directly apply to the considered problem, since the travel times along the edges of the network are assumed to be stochastic. Therefore, we define a 'shortest' path in probabilistic terms as one of the following:
Probabilistic Budget Stochastic Shortest Path: An s-t path that maximizes the probability of the EV reaching t before a given deadline d.
Non-dominated stochastic shortest path: A set of s-t paths that are not dominated by any other path in G.

The standard Charging Function Propagation approach to deterministic feasible route planning is adapted to the case of stochastic edge weights, and works as follows: The search starts from source with a starting state of charge $\beta$, and maintains a depletion function to a vertex v, which tracks the energy consumption of the EV from s to v. The amount of charge to be added at n-th charging station along the route is determined only when the search reaches the (n+1)-th charging station, in order to maintain probabilistic feasibility. All the possible total travel time-charging time tradeoffs are propagated along with the Dijkstra's search labels that are generated as the search reaches subsequent vertices.

A key idea behind our method is to augment the Dijkstra's search labels with augmented information required to keep track of the stochastic edge weights, including both travel times and energy consumptions. We maintain and propagate all sets of tradeoffs to be made between the charging times and total travel times that are possible without violating the probabilistic feasibility of routes.

In our approach, we provide a method for EV routing in the case where both travel times and energy consumptions are stochastic. The travel time on each edge $e \in E$ of a road network $G=\langle V,E\rangle$ is always a random variable $T_e$ with a known distribution (estimated from data, say). The energy consumption along e is a function $\varepsilon_e$ of EV speed and distance. We introduce two probabilistic definitions of route feasibility: We say that a route is $\mathbb{E}$-feasible if the SoC of the EV is always maintained above zero in expectation, and p-feasible if the probability of route feasibility is at least p. We show how to enhance stochastic routing queries for travel times with these feasibility criteria to find non-dominated feasible routes and probabilistic budget feasible routes. Our work addresses the four types of stochastic routing queries in the cells of the following table:

|  | $\mathbb{E}$-Feasibility | p-Feasibility |
|---|---|---|
| Non-Dominated Routes | ✓ | ✓ |
| Probabilistic Budget Routes | ✓ | ✓ |

We address these queries by generalizing the Charging Function Propagation algorithm to accommodate stochastic edge weights. We evaluate our methods experimentally using a realistic road network instance with travel time distributions derived from traffic speeds observed over four and a half months in the Los Angeles area, and real-world elevations and charging station locations. Further, we apply an uncertain variant of Contraction Hierarchies to speed up our queries and present results. Our results indicate that in general, $\mathbb{E}$-feasible routing queries can be computed much faster than p-feasible queries, and produce similar routes for longer routes with higher time budgets.

Problem Setup

A road network is a directed graph $G=\langle V,E\rangle$ where V is the set of vertices and $E:V\times V$ is the set of edges. An s-t path $P=[s=v_1, v_2 \ldots, v_n=t]$ is a sequence of adjacent vertices in the road network G. A set $C\subseteq V$ is marked as charging stations.

Definition 0.1 (State of Charge). The State of Charge (SoC) of an EV is the charge status of the EV's battery, lying between 0 and the battery capacity M. We denote the SoC on arrival at a vertex v by $_v\beta$ and the SoC at departure from v by $\beta_v$. We have $\beta_v \geq _v\beta$ if the EV charges its batteries at node v, and $\beta_v = _v\beta$ otherwise.

Each $c \in C$ has a monotonically increasing, piecewise-linear charging function $\Phi_c$ such that $\Phi_c(_c\beta, t_c) \mapsto \beta_c$ where $t_c$ is charging time. We require $_c\beta \geq 0$, and $\beta_c \leq M$.

Definition 0.2 (Leg and Prefix). A subpath $L=[c_1, \ldots, v, \ldots, c_2]$ is a leg of path P iff $c_1, c_2$ are successive charging stations along P. Each $\lambda_v=[c_1, \ldots, v]$, $v \neq c_2$ is a prefix of L.

Travel Times and Energy Depletion

The travel time along each edge e is a random variable $T_e$ with a known probability distribution. For problem tractability, we assume that the EV travels on e at a uniform speed drawn from the distribution $T_e$. This is reasonable, since variable travel time on an edge can be easily modeled by splitting an edge into several smaller edges.

Let $e_1, e_2, \ldots, e_{n-1}$ be the edges along path P, and let $e_k$ have travel time distribution $T_k$. The aggregate travel time distribution for the path P is $T_P = T_1 * T_2 * \ldots * T_{n-1}$, where * denotes linear convolution. Let $T_\emptyset$ be the Dirac "delta" distribution defined so that $T_\emptyset(0)=1$ and $T_\emptyset(x)=0$ at $x\neq 0$. Now, $T_\emptyset$ functions as a convolution identity, so $T_\emptyset * T_P = T_P$.

We assign to each edge e a function $\varepsilon_e : \mathbb{R}^1 \to \mathbb{R}$, which maps a travel time to the battery energy depleted by travel along e. The total energy depletion is the sum of the work done along e by the EV against air resistance, rolling resistance, and against gravity. The wind resistance grows quadratically with speed. If t is the travel time along edge e, these three terms cause $\varepsilon_e(t)$ to assume the form $$\varepsilon_e(t) = \frac{a_e}{t^2 - b_e} + \frac{c_e}{t} + d_e. \quad (1)$$

where $a_e, b_e, c_e, d_e$ are fixed coefficients for each edge e. We can derive the edge energy depletion distribution $D_e$ from the travel time distribution $T_e$ using Equation 1, thereby associating probabilities with energy depletions. A path may have negative energy depletion; EVs have regenerative brakes, and can accumulate charge, say, when going down a slope.

We can also aggregate energy depletion distributions using convolutions. If $e_1, e_2, \ldots, e_{n-1}$ are the edges along a path P, and edge $e_i$ has the depletion distribution $D_i$, the aggregate energy depletion distribution for P is $D_P = D_1 * D_2 * \ldots * D_{n-1}$. By analogy with $T_\emptyset$, we define $D_\emptyset$ to be the Dirac "delta" function corresponding to energy depletion, so that $D_\emptyset * D_P = D_P$. Sometimes, as with expected-feasibility queries, it suffices to add expectations directly, since $\mathbb{E}[D_1 * D_2] = \mathbb{E}[D_1] + \mathbb{E}[D_2]$.

$\mathbb{E}$-Feasible Routing

In this class of queries, we assume that the travel times are stochastic, but define feasibility in terms of the expectations for the energy depletion distributions. Say that an EV starts from vertex s with State of Charge (SoC) $\beta_s \in [0,M]$ and wishes to travel to vertex t along the s-t path P. Let leg $L=[c, \ldots, c']$ of P lie between charging stations c and c' along P.

Definition 0.3 ($\mathbb{E}$-Feasible Path). Leg L is expected-feasible (or $\mathbb{E}$-feasible) iff $\mathbb{E}[D_\lambda] \leq \beta_c$, where $D_\lambda$ is the depletion distribution for all prefixes $\lambda$ of L, and $\beta_c$ is the EV's SoC when it departs c. A path $P=[L_1, L_2, \ldots, L_n]$ is $\mathbb{E}$-feasible iff each of its legs $L_i$ is $\mathbb{E}$-feasible.

We consider two $\mathbb{E}$-feasible queries:

Query 0.1 (Non-Dominated $\mathbb{E}$-feasible Paths). Find the set of $\mathbb{E}$-feasible s-t paths such that their travel time distributions are not dominated by any other path.

Query 0.2 (Probabilistic Budget $\mathbb{E}$-feasible Path). Find an $\mathbb{E}$-feasible s-t path that maximizes the probability of reaching t before a given deadline d.

p-Feasible Routing

Definition 0.4 (p-Feasible Path). A path P with legs $L_1, L_2, \ldots, L_n$ is p-feasible iff the probability of the EV not being stranded along P is at least p, the non-stranding probability.

The non-stranding probability of P is given by the product of non-stranding probabilities of P's legs. For P to be p-feasible, each of its legs must have a non-stranding probability of at least p. We consider two p-feasible queries:

TABLE 1

Symbols used in this paper.

| Sym | Meaning | Sym | Meaning |
|---|---|---|---|
| $T_P$ | Travel time distribution on path P | $T_\emptyset$ | Convolution identity for T |
| $D_P$ | Energy depletion distribution on path P | $D_\emptyset$ | Convolution identity for D |
| $\delta_\lambda$ | Depletion function for leg prefix $\lambda$ | $\delta_\emptyset$ | Depletion function for null path |
| $_u\beta$ | SoC on arrival at vertex u | $\beta_u$ | SoC at departure from vertex u |
| $\Phi_c$ | Charging function at charging station c | $\varepsilon_e$ | Energy depletion function on edge e |

Query 0.3 (Non-Dominated p-Feasible Paths). Find the set of s-t paths whose travel time distributions are not dominated by any other path, and which ensure that probability not being stranded is at least p.

Query 0.4 (Probabilistic Budget p-Feasible Paths). Find an s-t path which maximizes the probability of reaching t before a given deadline d, while keeping the probability of not being stranded is at least p.

Charging Function Propagation for $\mathbb{E}$-Feasible Routing

The CFP algorithm uses only deterministic edge weights, but we show how to extend it to answer expected-feasible stochastic shortest path queries. We ensure that the SoC on departing a charging station suffices to complete the ensuing leg. Our Dijkstra's search labels maintain the set of all possible tradeoffs between charging time and the resulting SoC.

Figure 2:
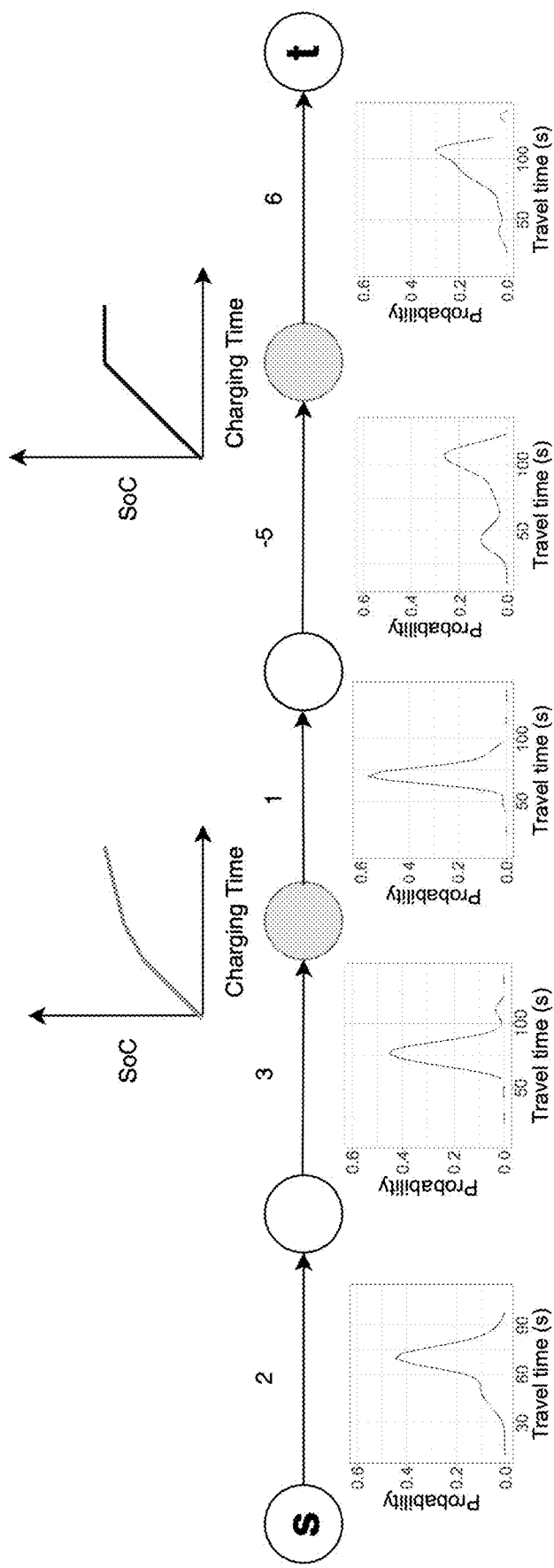
FIG. 2 is a schematic diagram illustrating $\mathbb{E}$-feasible queries along a path from a source to a destination through two charging vertices, where each edge along the path has an expected energy depletion weight value and a travel time distribution weight, according to an embodiment of the invention.

However, complexities arise since we use stochastic travel times. The deterministic case can simply use a min-priority queue ordered by travel times, but distributions can be ordered in different ways. For simplicity, we will use usual stochastic ordering to order the travel time distributions in the priority queue, under which two random variables X and Y obey $X \preceq Y$ iff $\Pr[X>x] \le \Pr[Y>x]$, $\forall x \in (-\infty, \infty)$. Other stochastic orderings, such as the hazard rate or likelihood ratio ordering, may result in interesting tradeoffs for the EV, but are beyond the scope of this paper. Also, deterministic travel times can be simply added along a path, but travel time distributions must be convolved to aggregate travel time distributions. FIG. 2 illustrates $\mathbb{E}$-feasible queries. Edges have two weights: a travel time distribution (below), and an expected energy depletion (above). Shaded nodes are charging stations, with piecewise-linear charging functions. The CFP search propagates travel time distributions using convolutions.

For expected-feasible routes, we will use stochastic travel times, but expected values for energy depletion. That is, let $e_1, e_2, \ldots, e_n$ be the edges comprising a path P, and let edge $e_i$ have travel time and energy depletion distributions $T_i$ and $D_i$. For expected-feasible routing, the aggregate travel time distribution $T_P = T_1 * T_2 * \ldots * T_n$, and the aggregate energy depletion value is $\mathbb{E}[D_P] = \mathbb{E}[D_1] + \mathbb{E}[D_2] + \ldots + \mathbb{E}[D_n]$.

The Depletion Function Along Route Legs

Even if the energy depletion over leg $L=[c_1, \ldots, v, \ldots, c_2]$ is deterministic with value $E_L$, departing $c_1$ with an SoC of $\beta_c$, $=E_L$ may not suffice to complete L. For instance, L may go up a hill, climbing which requires more energy than $\beta_{c_1}$. Similarly, $_{c_2}\beta$, the arrival SoC at $c_2$, may not equal $\beta_{c_1} + E_L$ when $E_L < 0$, since the SoC can never exceed M.

Consider a prefix $\lambda = [c, \ldots, v]$ of some leg that starts with charging station c. Let $s_\lambda$ be the minimum starting SoC required to traverse $\lambda$, $E_\lambda$ be the maximum ending SoC possible at v, and let $C_\lambda = \mathbb{E}[D_\lambda]$. The depletion function $\delta_\lambda$ (similar to SoC profiles) for prefix $\lambda$ maps the SoC at the start of $\lambda$ to the SoC at the end of $\lambda$, and is defined as $$\delta_\lambda(\beta_c) =_v \beta = \begin{cases} -\infty, & \text{if } \beta_c < S_\lambda, \\ E_\lambda, & \text{if } \beta_c - C_\lambda > E_\lambda, \\ \beta_c - C_\lambda, & \text{otherwise.} \end{cases} \quad (2)$$

The depletion function for a null path comprising a single vertex s is the identity depletion function $\delta_\emptyset \colon \beta_s \mapsto \beta_s$. Let $P_1 = [v_i, v_{i+1}, \ldots, v_j]$ and $P_2 = [v_{j+1}, v_{j+2}, \ldots, v_k]$ be contiguous segments, and $P = P_1 P_2 = [v_i, \ldots, v_k]$ be their concatenation. In this case, we have $S_P = \max\{S_{P_1}, C_{P_1} + S_{P_2}\}$, $E_P = \min\{E_{P_2}, E_{P_1} - C_{P_2}\}$ and $C_P = C_{P_1} + C_{P_2}$.

Dijkstra Search for $\mathbb{E}$-Feasible Routes

We find expected-feasible paths via Dijkstra search using two types of priority queues: the global queue $Q_G$ holds the travel time distributions from s to all other vertices in the road network G, and per-vertex queues $L_u(v)$ and $L_s(v)$. $L_u(v)$ and $L_s(v)$ hold the unsettled and settled search labels at vertex v respectively. All priority queues are ordered by $T_{[s \ldots v]}$ using the usual stochastic ordering $\preceq$ defined above. Each label in $L_s(v)$ corresponds to an s-v path already known to be feasible, and gives the required charging time at the last charging station. Consequently, we maintain the invariant that the minimum element in $L_u(v)$ is not dominated by any label in $L_s(t)$.

The EV leaves s having acquired an SoC of $\beta_s$ at s, so we treat s as a charging station, by default. One of our major challenges in the search will be to determine at which stations to charge, and for how long. Our search hence remembers the last charging station c along the route in the search labels, since dropping to an SoC below a permissible threshold signals the need to include a charging time at c, and update route times accordingly.

The Search Algorithm

When the search reaches vertex v, the label at v is a four-tuple $\langle T_{[s \ldots v]}, _c\beta, c, \delta_{[c \ldots v]} \rangle$, where $T_{[s \ldots v]}$ is the travel time distribution for the subpath $[s \ldots v]$, c is the last charging station en route from s to v, $_c\beta$ is the arrival SoC at c, and $\delta_{[c \ldots v]}$ is the depletion function of the subpath $[c \ldots v]$. We note that the charging times at some charging stations may be zero.

A label is extracted from $L_u(v)$ on each search iteration, where v is the minimum-travel time vertex in $Q_G$. It is then settled, and added to $L_s(v)$. A label in $L_s(v)$ represents a path from s to v that we know to be feasible, along with the exact charging time at the last charging station. A label in $L_u(v)$ represents a potentially feasible path that we haven't checked for feasibility. If an unsettled label in $L_u(v)$ is dominated by a label in $L_s(v)$, we can discontinue search along that path and discard that label, because we already know a better feasible path. The search proceeds as follows:

1. At s: Mark s as a charging station. Add the label $\langle T_\emptyset, \beta, s, \delta_\emptyset \rangle$ to $L_u(s)$.
2. At a non-charging vertex v: Let $\ell = \langle T_{[s \ldots ]}, _c\beta, c, \delta_{[c \ldots v]} \rangle$ be the label extracted from $L_u(v)$. Since $\ell$ indicates that c is the last charging station encountered, add label $\langle T_{[s \ldots v]}, \delta_{[c \ldots v]}(_c\beta), c, \delta_{[c \ldots v]} \rangle$ to $L_u(v)$ and update the travel times for t in $Q_G$.
3. At a charging vertex v: Let label $\ell = \rangle T_{[s \ldots v]}, _c\beta, c, \delta_{[c \ldots v]} \rangle$ be the minimum element extracted from $L_u(v)$. Let $t_c$ be the charging time at the last charging station c, so that $\beta_c = \Phi_c(_c\beta, t_c)$ is the SoC when the EV departs c.

The CFP algorithm uses only deterministic travel times, but our travel times are distributions. However, the charging times corresponding to the breakpoints of the charging function $\Phi_c(\cdot)$ capture the information required to make the required tradeoffs between charging times and travel times. To see how we approach the problem, let $\tau$ represent some value for the travel time from s to v, and compute $$b_\ell(t_c, \tau) := \begin{cases} \delta_{[c\ldots v]}(\beta_c) & \text{if } t_c > 0 \text{ and } T_{[s\ldots v]}(\tau) > 0 \\ -\infty & \text{otherwise} \end{cases}$$

Since the charging function $\Phi_c(\cdot)$ is assumed to be piecewise linear, its breakpoints induce breakpoints for $b_\ell$. For a given value of $\tau$ we need to create one label per breakpoint of $b_\ell$. For a fixed $\tau$ and each breakpoint $B=(t_B, SOC_B)$ of $b_\ell$, we add to $L_u(v)$ the label $\langle t_B, SOC_B, v, T_\emptyset \rangle$, and update the travel times to v in $Q_G$. In principle, $\tau$ can take an infinite number of values. We handle this difficulty by discretizing the domain of $T_e$. We use histograms to represent $T_e$ in our implementation, and generate only one set of breakpoints per histogram bin.

4. At the destination t: End search, backtrack using parent pointers to extract an s-t path.

A label $\ell$ is said to dominate another label $\ell'$ if $b_{\ell 40}(t,\tau) \geq b_{\ell' 40}(t,\tau)$ for all $t>0$ and all $\tau>0$.

If we end the search only when $Q_G$ is empty, not simply when t is reached, we obtain the $\mathbb{E}$-feasible non-dominated paths. For $\mathbb{E}$-feasible probabilistic budget paths, we end the search when $T_P(d)=0$, i.e. the probability of reaching t within the time budget d drops to 0.

Charging Function Propagation for p-Feasible Routing

Figure 3:
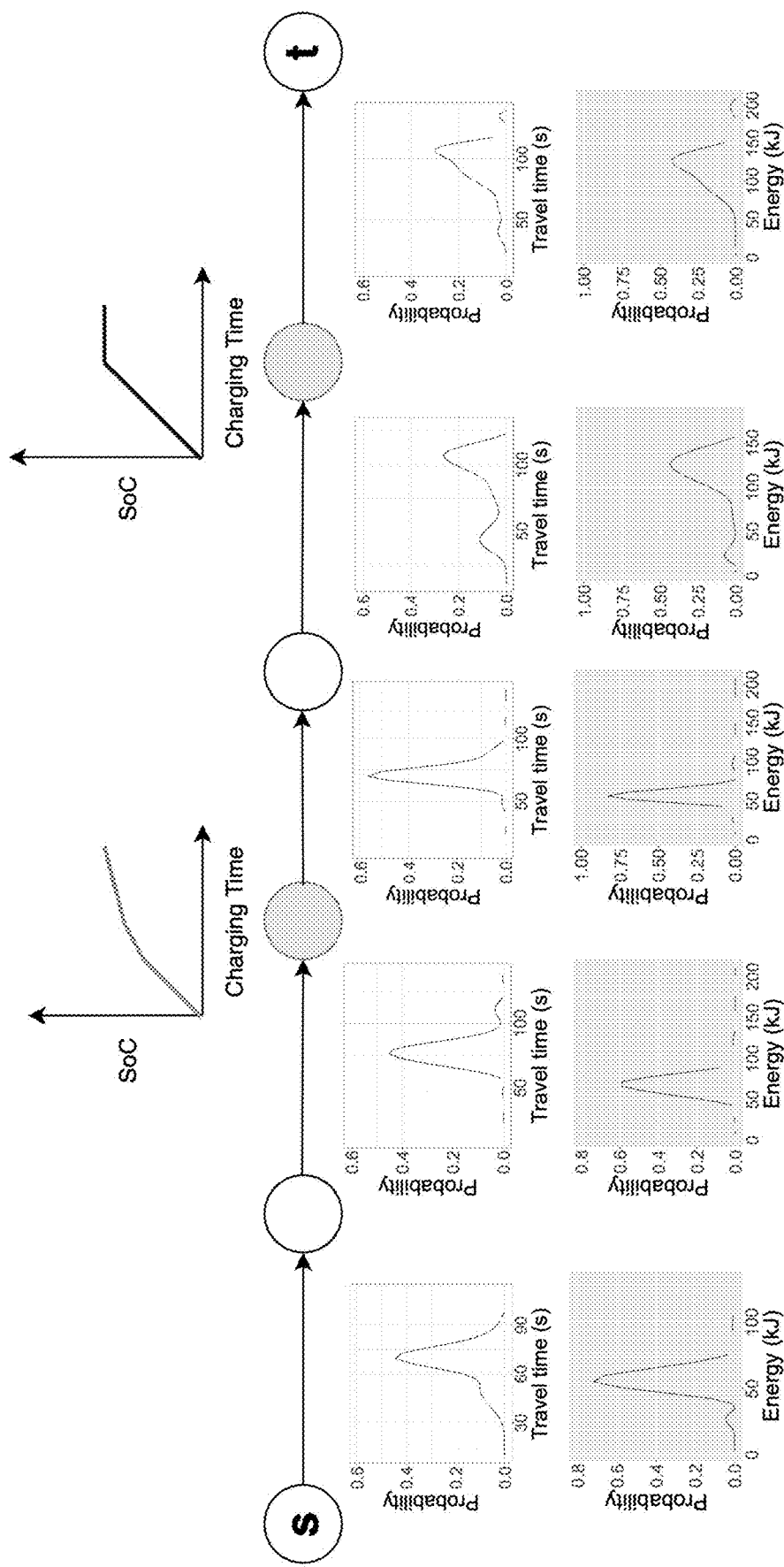
FIG. 3 is a schematic diagram illustrating p-Feasible queries along a path from a source to a destination through two charging vertices, where each edge along the path has a travel time distribution and an energy depletion distribution, according to an embodiment of the invention.

FIG. 3 illustrates p-Feasible queries. Travel time and energy depletion are both distributions, propagated by the CFP search using convolutions. While the non-dominated search stops only when $Q_G$ becomes empty, the probabilistic budget route search can stop when $T_P(t)$ drops to 0.

For p-feasible routing, we must consider the actual depletion distribution $D_P$ for a path P, not simply $\mathbb{E}[D_P]$, which sufficed for expected-feasible paths. As with expected-feasible paths, we must also deal with the travel time distribution $T_P$. If path P has the edges $e_1, e_2, \ldots, e_n$, then $T_P = T_1 * T_2 * \ldots * T_n$ and $D_P = D_1 * D_2 * \ldots * D_n$.

We can use p to place a bound on the maximum energy depletion we can accommodate over a path P. Let $$C_P(p) = \arg\max_x \{D_P(x) \leq p\},$$

so that $C_P(p)$ is the highest energy depletion that could occur along P with a probability of no more than p, that is, to ensure a non-stranding probability of p.

We define the stochastic depletion function analogously to Equation 2. Let $S_P(p)$ be the minimum starting SoC at s required to traverse P with non-stranding probability p. Similarly, let $E_P(p)$ be the maximum SoC possible on arriving at vertex t with at least probability p, and $C_P = D_P$. The stochastic depletion function for P is $$\sigma_P(\beta_s, p) =_t \beta = \begin{cases} -\infty, & \text{if } \beta_s < S_P(p), \\ E_P(p), & \text{if } \beta_s - C_P(p) > E_P(p), \\ \beta_s - C_P(p), & \text{otherwise.} \end{cases} \quad (3)$$

Let $\sigma_\emptyset$ be the identity stochastic depletion profile for a null path, so that $\sigma_\emptyset(\beta_s, p) = \beta_s$. If $P_1 = [v_i, v_{i+1}, \ldots, v_j]$ and $P_2 = [v_{j+1}, v_{j+2}, \ldots, v_k]$, the depletion profile of the concatenated path $P = P_1 P_2 = [v_i \ldots v_k]$ is given by $S_P(p) = \max\{S_{P_1}(p), C_{P_1}(p) + S_{P_2}(p)\}$, $E_P(p) = \min\{E_{P_2}(p), E_{P_1}(p) - c_{P_2}(p)\}$ and $C_P = C_{P_1} * C_{P_2}$.

Dijkstra Search for p-Feasible Routes

The label at vertex v is a four-tuple $\langle T_{[s\ldots v]}, c_\beta, c, \sigma_{[c\ldots v]} \rangle$, where $T_{[s\ldots v]}$ is the travel time distribution for the subpath $[s \ldots v]$, c is the last charging station enroute from s to v, $_c\beta$ is the arrival SoC at c, and $\sigma_{[c\ldots v]}$ is the stochastic depletion function of the subpath $[c \ldots v]$.

As for $\mathbb{E}$-feasible routes, we maintain a global priority queue $Q_G$ storing the travel time distributions from s, and queues $L_u(v)$ and $L_s(v)$ to store the unsettled and settled labels at vertex v respectively. All queues use the usual stochastic ordering. On each search iteration, a label is extracted from $L_u(v)$, where v is the minimum-travel time vertex in $Q_G$, settled, and added to $L_s(v)$. Each label in $L_s(v)$ represents a feasible path from s to v, including the charging time at the last charging station. Each label in $L_u(v)$ represents a potentially feasible path whose feasibility is yet unverified. If a label $\ell \in L_u(v)$ is dominated by $\ell' \in L_s(v)$, we can prune the search along that path and discard $\ell$, because a faster feasible path is already known. p-feasible queries have four parameters: the source vertex s, the destination vertex t, the $\beta_s$, and the given p. The search proceeds as follows:

1. At s: Mark s as a charging station. Add the label $\langle T_\emptyset, \beta, s, \sigma_\emptyset \rangle$ to $L_u(s)$.
2. At a non-charging vertex v: Let $\ell = \langle T_{[s\ldots v]}, c_\beta, c, \sigma_{[c\ldots v]} \rangle$ be the label extracted from $L_u(v)$. Since c is the last charging station encountered on the route represented by $\ell$, add label $\langle T_{[s\ldots v]}, \sigma_{[c\ldots v]}(_c\beta, p), c, \sigma_{[c\ldots]} \rangle$ to $L_u(v)$ and update the travel times for v in $Q_G$.
3. At a charging vertex v: Let $\ell = \langle T_{[s\ldots v]}, c_\beta, c, \sigma_{[c\ldots v]} \rangle$ be the label extracted from $L_u(v)$. Let $t_c$ be the charging time at the last charging station c, $\beta_c = \Phi_c(_c\beta, t_c)$. As with $\mathbb{E}$-feasible routes, the charging times corresponding to breakpoints of $\Phi_c(\cdot)$ suffice to make the required trade-off between charging and travel times. Let $\tau$ represent some value for travel time from s to v, and compute $$b'_\ell(t_c, \tau, p) := \begin{cases} \sigma_{[c\ldots v]}(\beta_c, p) & \text{if } t_c > 0 \text{ and } T_{[s\ldots v]}(\tau) > 0 \\ -\infty & \text{otherwise} \end{cases}$$

Since $\Phi_c(\cdot)$ is piecewise linear, its breakpoints induce breakpoints for $b_\oplus$. Moreover, p is already known at query time, so for a given value of $\tau$, we only need to create one label per breakpoint of $b_\oplus'$. For a fixed $\tau$ and each breakpoint $B=(t_B, SOC_B)$ of $b_\oplus'$, we add to $L_u(v)$ the label $\langle t_B, SOC_B, v, T_\emptyset \rangle$, and update the travel times to t in $Q_G$.

As with $\mathbb{E}$-feasible routes, $\tau$ can take an infinite number of values, but we use histograms to represent $T_e$, and we need to generate only one set of breakpoints per histogram bin. Lastly, we verify p-feasibility of path $[s \ldots v]$, by maintaining the running product of the non-stranding probabilities of all legs over this path. If this product falls below p, the path $[s \ldots v]$ is no longer p-feasible. The search is pruned and labels for v are dropped.

4. At the destination t: End search, backtrack using parent pointers to extract an s-t path.

For a given p, a label $\ell$ dominates another label $\ell'$ if $b'_\ell(t,\tau,p) \geq b'_{\ell'}(t,\tau,p)$ for all $t>0$ and $\tau>0$. If the search terminates only when $Q_G$ is empty, the resulting s-t paths are the p-feasible Non-Dominated Paths. For Probabilistic Budget queries, we end the search only when it reaches far enough for the probability of reaching t within the time budget d is 0.

Stochastic Contraction Hierarchies

For deterministic queries, Contraction Hierarchies (CHs) are widely used for speed up. Graph vertices are ranked, and contracted in ranked order. If u-v-w is a shortest path from u to w, vertex v is contracted by adding an edge u-w, and removing v from the graph. Such shortcuts significantly speed up the query-time Dijkstra search. The vertex ranks and the edge-weight hierarchy significantly affect preprocessing and query times. A multicriteria CH variant has been used for constrained shortest paths with positive weights. The CHArge algorithm combines a partial multicriteria CH with A* search. It contracts most graph vertices, creating a partial multicriteria CH but keeps an uncontracted core with charging stations. A* search using potential functions is used in the core to find routes at query time.

CHs have also been applied recently to stochastic route planning. However, we are interested in finding feasible routes that satisfy the energy bounds on EVs. Our queries are stochastic, and in fact doubly so. Travel time is always stochastic, and energy depletion is also stochastic for p-feasible queries. The stochastic dominance criterion is known to be too restrictive in practice, so it is hard to find dominating paths for most shortest paths in the network. Since the added shortcuts in CHs must not violate correctness, we can only avoid adding a shortcut covering a shortest path P only if we can find another witness path that dominates P.

We solve this problem by relaxing our definition of dominance as follows. For distributions $T_P$ and $D_P$, we use the restricted-dominance criterion, which checks if the CDF of one distribution is greater than that of the other within fixed interval I, which we set to two deviations on each side of $\mathbb{E}[T_P]$ or $\mathbb{E}[D_P]$. For search labels, we use a definition of $\epsilon$-dominance. We say that a label $\ell_1$ dominates another label $\ell_2$ if all breakpoints of $b_{\ell_1}$ or $b'_{\ell_1}$ have $SoC_B$ values within $\epsilon$ of $b_{\ell_2}$ or $b'_{\ell_2}$. We set $\epsilon=2\%$ of battery capacity in our experiments.

Experiments

Our algorithms were implemented in Rust 1.60.0-nightly with full optimizations and run on an Intel core i5-8600K processor with 3.6 GHz base clock, 192 KB of L1, 1.5 MB of L2, and 9 MB of L3 cache and equipped with 64 GB of dual-channel 3200 MHz DDR4 RAM.

Preparing a Realistic Routing Instance

We extracted traffic speeds from Mapbox Traffic Data[1] for Tile 0230123,[2] between 15th July and 30th November, 2019. Tile 0230123 covers Los Angeles county between Long Beach and Oxnard, and yielded a graph with 559,271 vertices and 1,058,450 edges. The dataset contained speed updates for an edge subset at 5-minute intervals, which we aggregated into weekday and weekend speed histograms. We discarded the weekend histograms due to sparsity, and used only the weekday speeds for our experiments. We added latitudes and longitudes for each vertex from the OSM dataset taken from GeoFabrik,[3] contracted the degree-2 vertices, and extracted the largest connected component. This step resulted in the final routing graph of 244,728 vertices and 453,942 edges.

[1]www.mapbox.com/traffic-data
[2]labs.mapbox.com/what-the-tile
[3]download.geofabrik.de/north-America/us/california/socal.html We added elevation data from the NASADEM dataset at 30 M resolution to each vertex, using bilinear interpolation to estimate elevations at vertex locations. Lastly, we obtained charging stations from the Alternative Fuels Data Center,[4] marking the vertex closest to each charging station as the charging vertex. The charging function $\Phi D_c$ on each vertex c was linear, and either (1) a slow, charging to 100% in 100 minutes, or (2) fast, charging up to 80% in 30 minutes, and up to 100% in 60 minutes. We randomly assigned the slow charging function to 70% of charging stations, the fast charging function to the rest.

[4]afdc.energy.gov/fuels/electricitylocations.html

Energy consumption parameters for $\epsilon_e$ on all edges e were derived using the vertex elevations and the values $a_e$, $b_e$, $c_e$, $d_e$ used for a Nissan Leaf 2013. To force the search to require charging en route for feasibility, we assumed that the EV had a 12 kWh battery.

Choice of edge weight representation: Histograms capture arbitrary $T_e$ and $D_e$ distributions, but take more space. Functions may be less faithful to real-world distributions, but are compact and may lead to faster queries in some cases. We used histograms to represent the travel time and energy consumption distributions on edges since our dataset had enough data for most edges. This allows us to represent arbitrary distributions while keeping the implementation simple.

Applying Contraction Hierarchies: Building a full CH by contracting all vertices of the graph can be prohibitively expensive due to the high cost of contracting the highest ranked vertices. So, we build a only partial CH by contracting 97% of the vertices, keeping an uncontracted core containing all the charging stations on the network. Queries are run in three stages—from s to a vertex in the core restricted to using only (upward) edges from lower to higher ranked vertices, backward search from t to a vertex in the core using downward edges, and a simple bidirectional search within the core of the network.

Results

Using stochastic edge weights raises many challenges that do not arise for deterministic weights. Two obvious issues are maintaining route feasibility, and aggregating edge distributions $T_e$ and $D_e$ into path distributions $T_P$ or $D_P$, which requires expensive convolutions. Several other issues also arise, two of which we will discuss.

Number of histogram bins: The time and energy value ranges in the path distributions $T_P$, $D_P$ increases linearly with the number of edges in P, so more histogram bins are needed to maintain accuracy. As in the deterministic case, the Dijkstra search labels track the travel time-charging time tradeoff. The labels represent histograms, so the label sizes increase with the number bins used for $T_P$ and $D_P$. Labels become progressively larger for longer routes, raising the cost of all operations on the distributions, (convolution, dominance checks, etc.).

At charging stations, moreover, we must create a set of breakpoints per bin of the energy depletion histogram. More breakpoints are created for charging stations further along the route, increasing costs and making label dominance checks labels more difficult.

We also note that the CH shortcuts represent longer routes, whose histograms have more bins than the original graph edges. Shortcut edges are hence more expensive to handle than original graph edges, decreasing the utility of shortcuts in speeding up route planning queries.

Ensuring stochastic feasibility: Standard probabilistic budget routes use a single criterion, such as travel time. In contrast, our queries must handle search with two criteria to maintain feasibility. Further, the number of breakpoints in the charging functions along a route determines the number of labels generated.

For deterministic edge weights, path costs are just sums of edge costs, so routing takes just microseconds even on continent-sized road networks. Routing with stochastic edge weights is far slower, since the convolutions needed to get path costs are very expensive. Prior work deals only with stochasticity in time, ignoring energy feasibility, but we consider both aspects. Our methods take tens of seconds, which is comparable to these prior methods. In preliminary experiments, our use of stochastic, multicriteria CH yielded a 2-2.4 factor speedup over queries not using CH. In deterministic settings, similar methods achieve speedups of two to three orders of magnitude. This lower gain can be attributed to the weaker 'hierarchy' with stochastic edge weights, causing far more shortcuts to be added to the original graph. This forces the Dijkstra search to scan many more edges on settling each vertex.

TABLE 2

Single-criterion probabilistic budget routing queries vs. our $\mathbb{E}$-feasible and p-feasible queries on the Tile 0230123 graph. Query times (seconds) are averages over 100 random vertex pairs. The EV is a Nissan Leaf 2013 with 12 kWh battery and 50% starting SoC.

| | Feasibility | $\mathbb{E}$-feasible | p-feasible Routes | | |
|---|---|---|---|---|---|
| d | Ignored | Routes | p = 0.8 | p = 0.85 | p = 0.9 |
| 5 min. | 6.192 | 10.662 | 12.993 | 11.99 | 10.31 |
| 15 min. | 19.999 | 24.711 | 38.71 | 38.9 | 36.2 |
| 25 min. | 45.384 | 38.123 | 75.05 | 73.8 | 71.34 |

Table 2 quantifies the overhead of maintaining feasibility of routes in stochastic settings, and compares the query times for single-criteria probabilistic budget routes (time only, feasibility ignored) with those of our two-criteria feasible probabilistic budget routes. Single-criteria routing is fastest, followed by $\mathbb{E}$-feasible routing, and p-feasible routing. The anomaly for d=25 minutes can be understood as follows. Multicriteria search must explore a larger set of routes from the source than single-criteria queries, because it needs to return the pareto frontier of routes, rather than a single route. The $\mathbb{E}$-feasible and p-feasible queries must also carry and update per-vertex labels, and maintain more information in each label to capture the travel time-charging time tradeoffs. However, we use the restricted dominance criterion for $\mathbb{E}$-feasible and p-feasible routes but not for the single-criteria routes, making the cost per convolution is slightly lower for the two feasible-path queries. This suffices to make $\mathbb{E}$-feasible routing slightly faster for longer routes than even single-criterion queries.

TABLE 3

$\mathbb{E}$-feasible and p-feasible query performance on the Tile 0230123 graph, with real-world charging station and elevation data. Query times (seconds) are over 500 random vertex pairs. EV used is a Nissan Leaf 2013 fitted with a 12 kWh battery and 50% starting SoC.

| | Feasibility | Time Budget (d) | | | |
|---|---|---|---|---|---|
| Query Type | Threshold | 10 min. | 20 min. | 30 min. | 40 min. |
| $\mathbb{E}$-feasible | — | 18.01 | 34.975 | 48.662 | 72.198 |
| p-feasible | p = 0.8 | 33.1 | 52.895 | 81.94 | 91.04 |
| | p = 0.85 | 27.1 | 49.58 | 80.35 | 98.312 |
| | p = 0.9 | 26.43 | 47.901 | 78.419 | 96.51 |

Table 3 compares $\mathbb{E}$-feasible and p-feasible queries, for longer deadlines. $\mathbb{E}$-feasible queries are generally faster than p-feasible queries because they must convolve only $T_P$, but p-feasible queries convolve both $T_P$ and $D_P$. p-feasible queries with higher p thresholds tend to run slightly faster, as they can prune the search quicker than searches run with lower p.

Table 4 shows how similar the $\mathbb{E}$-feasible and p-feasible routes are, using the average Jaccard Similarity between the set edges of a route chosen by each of them. The Jaccard similarity for two routes $P_1$ and $P_2$ is the number of edges common to both divided by the number of edges in their union. That is, $$J(P_1, P_2) = \frac{|\{e \in P_1\} \cap \{e \in P_2\}|}{|\{e \in P_1\} \cup \{e \in P_2\}|}$$

TABLE 4

Average Jaccard Index for 500 random $\mathbb{E}$-feasible and p-feasible routes, with p = 0.85. The index is 0 when the routes are edge-disjoint, and 1 when they are identical.

| Queries Compared | d | Avg. Jaccard Index |
|---|---|---|
| $\mathbb{E}$-feasible and p-feasible, for p = 0.85 | 10 min. | 0.73 |
| | 20 min. | 0.74 |
| | 30 min. | 0.87 |
| | 40 min. | 0.94 |

The Jaccard index clearly increases with the time budget, so the $\mathbb{E}$-feasible and p-feasible routes are more similar when the routes are longer. This is because longer routes require more convolutions, making $D_P$ closer to the Gaussian, which is more concentrated near its mean. In such cases, the pruning of edges forced by the feasibility criterion brings the set of edges of $\mathbb{E}$-feasible routes closer to the set of edges for p-feasible routing. For shorter routes, however, the difference between the two types of queries is higher. Hence, if stronger feasibility guarantees are desired for shorter routes, p-feasible queries may be better.

In conclusion, EV routing methods usually model the problem as a generalized constrained shortest-path problem, with deterministic travel times and energy consumptions. This is unrealistic since these are really stochastic parameters. Current stochastic route planning methods either fail to ensure that routes are energy-feasible, or when they do, have not been shown to scale well to large graphs. We have herein addressed this shortcoming by making travel time and energy consumption stochastic, and requiring paths to be energy-feasible. We defined two energy-feasibility criteria, namely, $\mathbb{E}$-feasibility and p-feasibility. We showed how to generalize the standard Charging Function Propagation algorithm to accept stochastic edge weights, while allowing recharging stations. We also applied a multicriteria variant of stochastic Contraction Hierarchies to speed up our queries, using the restricted stochastic dominance criterion and the ϵ-dominance among labels. We demonstrated that our techniques were feasible in the real world by running experiments on a realistic routing instance, using real-world travel speeds in the Los Angeles area collected over four and a half months. A tiered-hierarchy style approach may be used to help speed up stochastic feasible routing queries even further.

The invention claimed is:

1. A method for stochastic electrical vehicle route planning, the method comprising:
    storing at a server that is communicatively coupled with one or more vehicles via a wireless communication network, a vehicle road network as a graph comprising vertices and edges between vertices, where the vertices represent locations in the vehicle road network and the edges represent road segments between the locations, where some vertices represent charging stations associated with charging functions representing tradeoffs between vehicle charging times and charge added;
    storing at the server for each edge of the graph a first edge weight representing travel time along the edge, and storing for each edge of the graph a second edge weight representing energy consumption for travel along the edge, where the first edge weight is represented as a probability distribution, and the second edge weight is represented as either a probability distribution or a deterministic value representing an expectation of a distribution;
    receiving from a vehicle over a communication network, a vehicle origin and a vehicle destination;
    performing a Dijkstra search on the graph from the vehicle origin to the vehicle destination, wherein the Dijkstra search computes for each vertex along a path in the network from the vehicle origin to the vehicle destination a convolution of edge weights along the path, wherein the Dijkstra search comprises computing and propagating along the path, labels representing the tradeoffs between charging times and total travel-time, wherein the probability distributions are discretized distributions and wherein the labels computed during the Dijkstra search are propagated per domain interval of the discretized distributions;
    transmitting over the wireless communications network to the vehicle a feasible path produced from the Dijkstra search, wherein the feasible path is above a user-specified non-stranding probability, and wherein the feasible path is configured to guide a human driver or an autonomous driving system.

2. The method of claim 1, wherein the feasible path is feasible either probabilistically or in expectation.

3. The method of claim 1, wherein the labels comprise; stochastic travel time distributions along the path, stochastic energy consumption distributions along the path, deterministic energy consumption values along the path, or fixed amounts of energy consumed along the path.

4. The method of claim 1, wherein the labels comprise an expectation of an energy consumption distribution from an immediately preceding charging vertex along the path from the vehicle origin.

5. The method of claim 1, wherein the labels comprise a state of charge on arrival at a charging vertex with a non-stranding probability p or a non-stranding guarantee in case of deterministic energy consumptions, and a charging function at the charging vertex.

6. The method of claim 1, wherein the energy consumption is a probability distribution, and wherein the tradeoffs between charging times and total travel-time are constrained to satisfy a predetermined user-specified probabilistic feasibility of the route representing a level of assurance that a vehicle traveling the computed route will not be stranded.

7. The method of claim 1, wherein the energy consumption is deterministic, and wherein the tradeoffs between charging times and total travel-time are constrained to satisfy a non-stranding guarantee.

8. The method of claim 1, wherein the discretized distributions are set as edge-weight histograms in a graph representing the road network.

9. The method of claim 1, performing the Dijkstra search comprises choosing a best label by selecting a dominance criterion, ranking a collection of labels corresponding to bins of the discretized distributions according to the selected dominance criterion, and selecting a highest-ranked label.

10. The method of claim 1, wherein receiving over a communication network the vehicle origin and the vehicle destination further comprises receiving relevant vehicle parameters, an optimality criterion to be used in routing, and a type and level of non-stranding assurance.

11. The method of claim 1, wherein receiving from the vehicle comprises receiving from a mobile device in the vehicle.

12. A server comprising at least one processor and a memory, wherein the server is configured to perform a method comprising:
    storing at a server that is communicatively coupled with one or more vehicles via a wireless communication network, a vehicle road network as a graph comprising vertices and edges between vertices, where the vertices represent locations in the vehicle road network and the edges represent road segments between the locations, where some vertices represent charging stations associated with charging functions representing tradeoffs between vehicle charging times and charge added;
    storing at the server for each edge of the graph a first edge weight representing travel time along the edge, and storing for each edge of the graph a second edge weight representing energy consumption for travel along the edge, where the first edge weight is represented as a probability distribution, and the second edge weight is represented as either a probability distribution or a deterministic value representing an expectation of a distribution;
    receiving from a vehicle over a communication network, a vehicle origin and a vehicle destination;
    performing a Dijkstra search on the graph from the vehicle origin to the vehicle destination, wherein the Dijkstra search computes for each vertex along a path in the network from the vehicle origin to the vehicle destination a convolution of edge weights along the path, wherein the Dijkstra search comprises computing and propagating along the path, labels representing the tradeoffs between charging times and total travel-time, wherein the probability distributions are discretized distributions and wherein the labels computed during the Dijkstra search are propagated per domain interval of the discretized distributions;
    transmitting over the wireless communications network to the vehicle a feasible path produced from the Dijkstra search, wherein the feasible path is above a user-specified non-stranding probability, and wherein the feasible path is configured to guide a human driver or an autonomous driving system.

13. The server of claim 12, wherein the feasible path is feasible either probabilistically or in expectation.

14. The server of claim 12, wherein the labels comprise: stochastic travel time distributions along the path, stochastic energy consumption distributions along the path, deterministic energy consumption values along the path, or fixed amounts of energy consumed along the path.

15. The server of claim 12, wherein the labels comprise an expectation of an energy consumption distribution from an immediately preceding charging vertex along the path from the vehicle origin.

16. The server of claim 12, wherein the labels comprise a state of charge on arrival at a charging vertex with a non-stranding probability p or a non-stranding guarantee in case of deterministic energy consumptions, and a charging function at the charging vertex.

17. The server of claim 12, wherein the energy consumption is a probability distribution, and wherein the tradeoffs between charging times and total travel-time are constrained to satisfy a predetermined user-specified probabilistic feasibility of a route representing a level of assurance that a vehicle traveling a computed route will not be stranded.

18. The server of claim 17, wherein the discretized distributions are set as edge-weight histograms in a graph representing the road network.

19. The server of claim 17, wherein the performing the Dijkstra search comprises choosing a best label by selecting a dominance criterion, ranking a collection of labels corresponding to bins of the discretized distributions according to the selected dominance criterion, and selecting a highest-ranked label.

* * * * *